United States Patent
Hel-Or (10) Patent No.: US 7,916,940 B2
(45) Date of Patent: Mar. 29, 2011

(54) PROCESSING OF MOSAIC DIGITAL IMAGES

(75) Inventor: Yacov Hel-Or, Zichron Yacov (IL)

(73) Assignee: Hewlett-Packard Development Company, Houston, TX (US)

( * ) Notice: Subject to any disclaimer, the term of this patent is extended or adjusted under 35 U.S.C. 154(b) by 1853 days.

(21) Appl. No.: 10/769,411

(22) Filed: Jan. 31, 2004

(65) Prior Publication Data

US 2005/0169521 A1    Aug. 4, 2005

(51) Int. Cl.
 G06K 9/62    (2006.01)
 G03F 3/08    (2006.01)
(52) U.S. Cl. .................. 382/167; 358/518; 358/520
(58) Field of Classification Search .............. 382/167, 382/300, 260–266, 254, 268, 219, 274, 275, 382/166, 162; 358/518–521, 512, 513, 525, 358/3.08, 3.27, 3.26; 348/234, 272, 273, 348/280, 607, 625, 222.1; 345/589–590
See application file for complete search history.

(56) References Cited

U.S. PATENT DOCUMENTS

| | | | |
|---|---|---|---|
| 5,995,668 A * | 11/1999 | Corset et al. | 382/233 |
| 6,088,397 A * | 7/2000 | Jeannin | 375/240.16 |
| 6,088,489 A * | 7/2000 | Miyake | 382/299 |
| 6,404,918 B1 * | 6/2002 | Hel-or et al. | 382/167 |
| 6,618,503 B2 * | 9/2003 | Hel-or et al. | 382/167 |
| 2002/0122586 A1 * | 9/2002 | Hel-Or et al. | 382/162 |
| 2003/0151674 A1 * | 8/2003 | Lin | 348/222.1 |
| 2004/0169890 A1 * | 9/2004 | Maurer | 358/3.08 |

* cited by examiner

Primary Examiner — Samir A Ahmed
Assistant Examiner — Mehdi Rashidian (57) ABSTRACT

A full color output image is estimated from a mosaic digital image, the output image is transformed from an original color space into a luminance/chrominance color space, chrominance components of the transformed output image are smoothed, the image is re-transformed back to its original color space, and corresponding pixels in the re-transformed image are re-set to sampled values.

40 Claims, 6 Drawing Sheets

PROCESSING OF MOSAIC DIGITAL IMAGES

BACKGROUND

A typical digital camera includes an array of photosensors, with each photosensor sensitive to only a single color of light. For example, each photosensor is sensitive to one of red, green and blue light. During image acquisition, an image is focused on the photosensor array, and each photosensor measures or "samples" a single color of the image. If red-sensitive, green-sensitive and blue-sensitive photosensors can be located at each pixel, the photosensor array can acquire an image having "full color" at each pixel.

The photosensor arrays of certain digital cameras have only a single photosensor at each pixel location, and produce digital images having only a single color sample at each pixel. For example, a digital camera produces a digital image having one of red, green and blue sampled information at each pixel. Information about the other two colors at each pixel is missing. This undersampled digital image is referred to as a "mosaic" image.

A demosaicing algorithm may be used to transform an undersampled digital image into a digital image having full color information at each pixel value. A typical demosaicing algorithm interpolates the missing pixel information from the sampled pixel values in the mosaic image. A goal of demosaicing is reconstruction of an image that is perceived to be similar to the image focused on the photosensor array.

Edges and other abrupt photometric transitions present a particular problem to demosaicing. Simple demosaicing algorithms such as bilinear interpolation do not account for edges; consequently, color information at edges in the demosaiced image can be distorted (e.g., edges can be blurred).

More complex demosaicing algorithms try to account for edges. However, even the more complex demosaicing algorithms can introduce artifacts into demosaiced images. Zippering and fringing are typical artifacts at edges in demosaiced images. These artifacts can degrade image quality.

A typical digital camera can perform on-board demosaicing. This color at each pixel. However, memory and processing power of a typical digital camera are limited. The limited memory and processing power can constrain the complexity of the demosaicing algorithm and hamper the ability to account for edges and reduce artifacts at the edges during demosaicing.

A demosaicing algorithm that is simple and fast, and that reduces edge artifacts or blurring is desirable. Such a demosaicing algorithm is especially desirable for digital cameras.

SUMMARY

According to one aspect of the present invention, a full color digital image is produced from a mosaic digital image having sampled values. A full color output image is estimated from the mosaic image, the output image is transformed from an original color space into luminance/chrominance color space chrominance components of the transformed output image are smoothed, the image with the smoothed chrominance components is re-transformed back to the original color space, and corresponding pixels in the re-transformed image are re-set to the sampled values.

Other aspects and advantages of the present invention will become apparent from the following detailed description, taken in conjunction with the accompanying drawings, illustrating by way of example the principles of the present invention.

DETAILED DESCRIPTION

As shown in the drawings for purposes of illustration, the present invention is embodied in the processing of a mosaic image to produce a digital image having full color information at each pixel. One color band is inferred from other color bands. The processing is based on a Bayesian approach which exploits color band dependencies in color images. It is assumed that spatial discontinuities in different color bands are aligned and that this characteristic can be exposed in the statistics of the spatial derivatives. This allows a reduction of aliasing artifacts and enables reconstruction of frequencies that are above Nyquist.

Statistical dependencies between color bands may be characterized in a joint spatial-spectral (color) domain. Define a color image as a three dimensional vector field $h(x; y)=(R(x; y); G(x; y); B(x; y))^T$, where R, G and B represent the Red, Green and Blue color bands of the image. The mutual dependencies between color values in the image can be analyzed by studying their joint distribution. The problem is that the entire distribution is defined over a huge dimensional space ($3n^2$ dimensional space for n×n image). This problem may be solved by approximating the joint distribution over a subspace (low dimensional) where relevant information is still preserved.

Since the processing involves the prediction of one color band given another, the spatial-spectral subspace which maximizes the correlations between different color bands will is of interest. Canonical Correlation Analysis (CCA) may be used to determine the best subspace in the spatial-spectral domain. Using CCA, it was found that Spatial derivatives are the projections in which color correlations are maximized. The characteristic distribution of 3D derivative histograms (e.g., R- directional- derivative vs. G-directional-derivative vs. B-directional-derivative) suggests that directional derivatives of color images are highly similar, i.e. highly probable to be located about the main diagonal (1; 1; 1) of the 3D derivative histogram.

Investigating the 3D derivative histogram of natural images, the following two findings were made. First, the spatial derivatives of different color bands, taken at the same image location, are highly probable to be similar to each other (this is not necessarily true for the color values themselves). Second, the derivatives tend to be statistically independent if the image data is represented in a coordinate system which is aligned with the main diagonal.

Define a color space (I, c1, c2) as $$\begin{pmatrix} l \\ c_1 \\ c_2 \end{pmatrix} = T \begin{pmatrix} R \\ G \\ B \end{pmatrix} \text{ where}$$

$$T = \begin{pmatrix} 1/\sqrt{3} & 0 & 0 \\ 0 & 1/\sqrt{2} & 0 \\ 0 & 0 & 1/\sqrt{6} \end{pmatrix} \begin{pmatrix} 1 & 1 & 1 \\ 1 & -1 & 0 \\ 1 & 1 & -2 \end{pmatrix}$$

where l represents pixel luminance and where $c_1$, $c_2$ represent the pixel chrominance. The luminance is aligned with the main diagonal, and the two chrominance axes span the plane perpendicular to the main diagonal. In this coordinate system, the spatial derivatives (Ix; c1x; c2x) are, at a good approximation, statistically independent. Additionally, in this representation is can be observed that high spatial derivatives is highly probable to occur in the luminance band but improbable in the chrominance band.

This finding is in accord with the perceptual properties of the human visual system (HVS) where the HVS is less sensitive to high frequencies in the chrominance domain compared to its sensitivity in the luminance domain. Consequently, the processing according to the present invention not only exploits color redundancies, but also minimizes the perceived difference between the actual and the reconstructed images.

The processing is not limited to any particular photosensor arrangement. For the purposes of illustration, the processing will be described in connection with a photosensor arrangement known as a Bayer color filter array (CFA).

Figure 1:
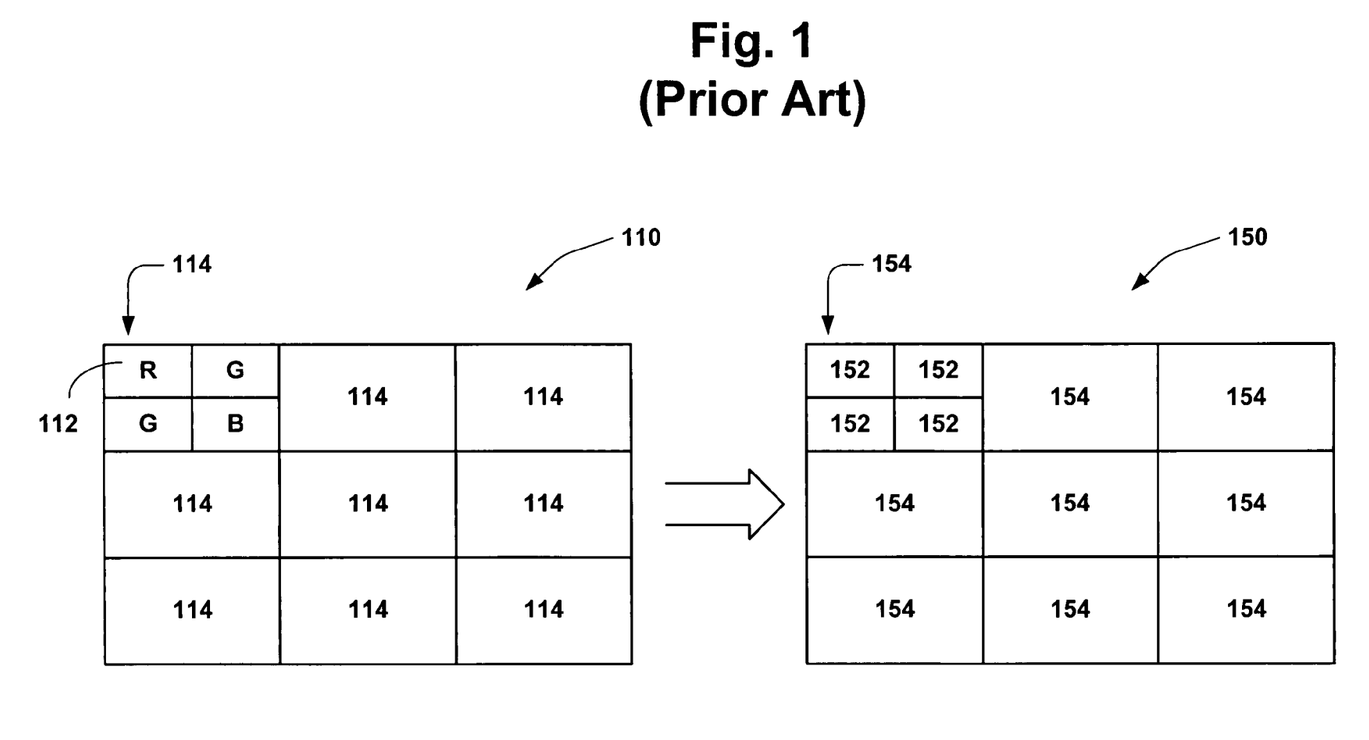
FIG. 1 is an illustration of a photosensor arrangement for a typical digital camera, and corresponding pixels of a mosaic image.

Reference is made to FIG. 1, which illustrates a photosensor array 110 having photosensors 112 arranged in a Bayer CFA. The photosensors 112 are arranged in 2×2 cells 114. Each cell 114 consists of two photosensors sensitive to green (G) light only, one photosensor sensitive to red (R) light only, and one photosensor sensitive to blue (B) light only. The cells 114 are repeated (tiled) across the photosensor array 110.

FIG. 1 also illustrates a mosaic digital image 150. Each block 154 of the mosaic image 150 corresponds to a cell 114 of the photosensor array 110. Each pixel 152 of the mosaic image 150 is described by an n-bit word, and each n-bit word provides one of red, green and blue color sampled information. In each 2×2 block 154 of the mosaic image 150, green information is provided at two pixels, red information is provided at one pixel, and blue information is provided at one pixel.

Figure 2:
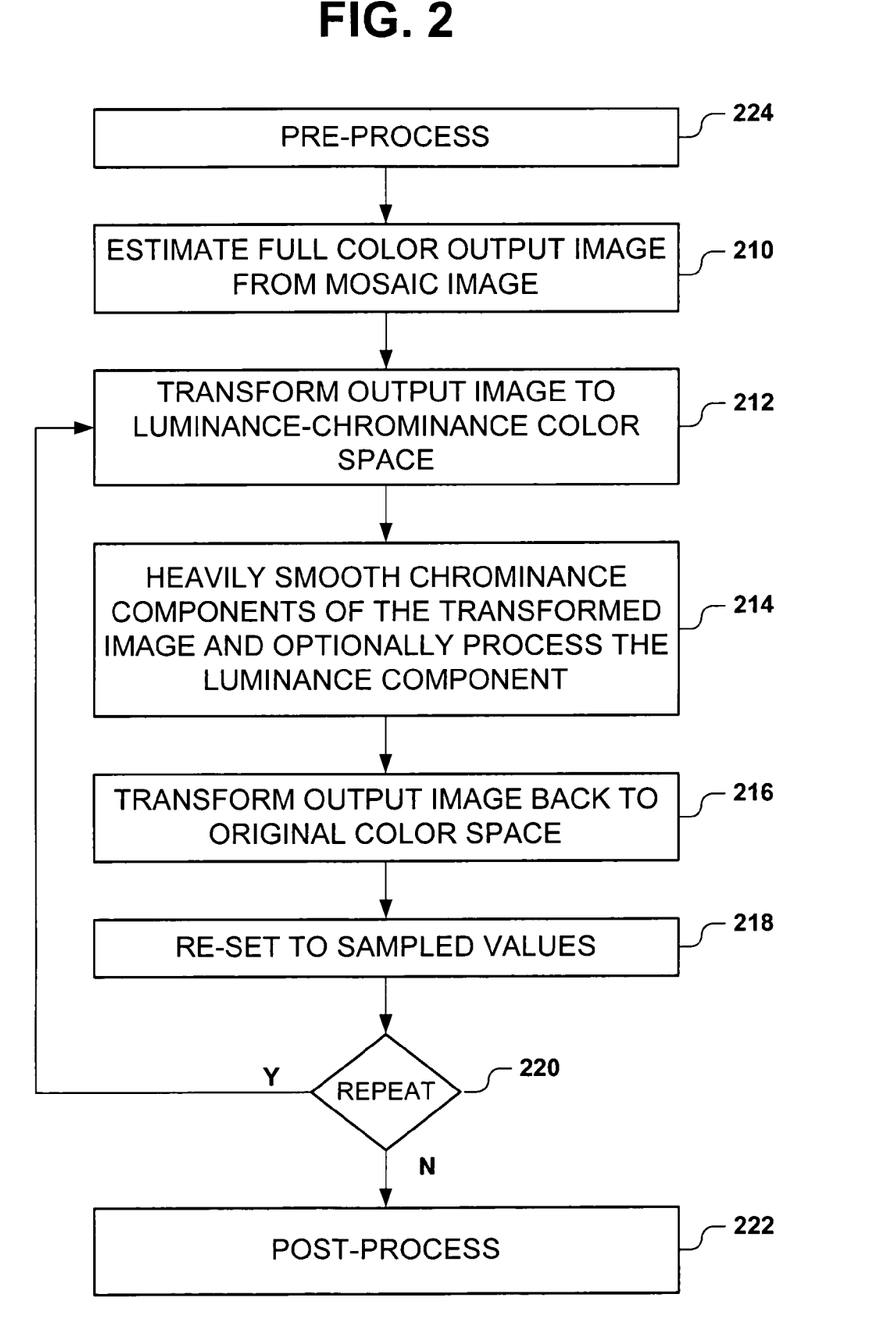
FIG. 2 is an illustration of a method of performing image processing in accordance with an embodiment of the present invention.

Reference is made to FIG. 2, which illustrates a method of processing a mosaic digital image. Pixel values of the mosaic image 150 may be denoted as m(i,j), where i and j are indices to the rows and columns of the mosaic image 150.

A full color output image is estimated from the mosaic image (210). Sampled values in the mosaic image may be copied directly into their corresponding positions in the output image, and missing information in each of the green, red and blue color planes may be estimated from the sampled values. The same algorithm may be used to estimate each color plane of the output image, or different algorithms may be used.

The output image is transformed from RGB color space into a luminance/chrominance color space (212). The (I,$c_1$, $c_2$) color space is a particular example of a luminance/chrominance color space. Other examples of luminance/chrominance color space include without limitation YIQ, YCbCr, HSV, and CIE-LAB.

Chrominance components of the transformed output image are heavily smoothed (214). In terms of frequencies, light smoothing would be less aggressive in reducing high frequencies of an image, as compared to the strong smoothing. The smoothing may be isotropic or anisotropic. According to the principles achieved by the suggested statistical inference, natural images are expected to be smooth in chrominance bands, whereas high frequencies are more probable in the luminance band. Hence the luminance band may be lightly smoothed; left unchanged, or even lightly sharpened (214).

The output image is transformed back to its original color space (216). In this example, the output image is transformed back to RGB color space.

Corresponding pixel values in the re-transformed image are re-set to the original sampled values in the mosaic image (218). For example, a k×k mosaic image with a Bayer pattern has pixel inputs m(i,j), where i and j are indices to the rows and columns of the k×k mosaic image, and i,j=[0 . . . k−1]. The sampled values of the mosaic image may be copied to the output image as follows:

$I_R(i,j)$=m(i,j) for all red samples (i and j even),
$I_G(i,j)$=m(i,j) for all green samples (i+j odd), and
$I_B(i,j)$=m(i,j) for all blue samples (i and j odd), where $I_R(i,j)$ represents red information at pixel (i,j) of the output image, $I_G(i,j)$ represents green information at pixel (i,j) of the output image, and $I_B(i,j)$ represents blue information at pixel (i,j) of the output image.

This step imposes a constraint on the interpolation. After filtering in the luminance/chrominance color space, the filtered values are likely to deviate from the sampled (original, measured) values. Imposing the constraints by resetting to the sampled values is performed to replace output values with the sampled values in their corresponding positions.

Steps 212-218 may be repeated several times (220). These steps may converge to an optimal result. The iterations may be stopped when the result is "close enough" to the optimum. For example, the iterations can be stopped when the improvement (e.g., Euclidean distance between successive iterations) becomes smaller than a threshold. Alternatively, a fixed number of iterations can be performed. The fixed number would typically bring the output close enough to the optimum.

Post-processing such as sharpening may be performed on the output image after the last iteration (222). The sharpening may be performed to compensate blurring due to system optics. Conventional sharpening such as unsharp masking or Wiener filtering may be performed. The post-processing is application-specific. In a digital camera for example, the post-processing may include color transformation, tone reproduction, sharpening, de-noising and compression.

The sampled values may be pre-processed (224). The pre-processing is application-specific. In a digital camera, for example, pre-processing between image acquisition and demosaicing may include flare reduction, data linearization, color balance, and de-noising. De-noising may be performed if the sampled pixel values (that is, the raw data) are noisy or expected to be noisy. Noisy raw data can cause artifacts and noise to appear in the demosaiced image.

Figure 3:
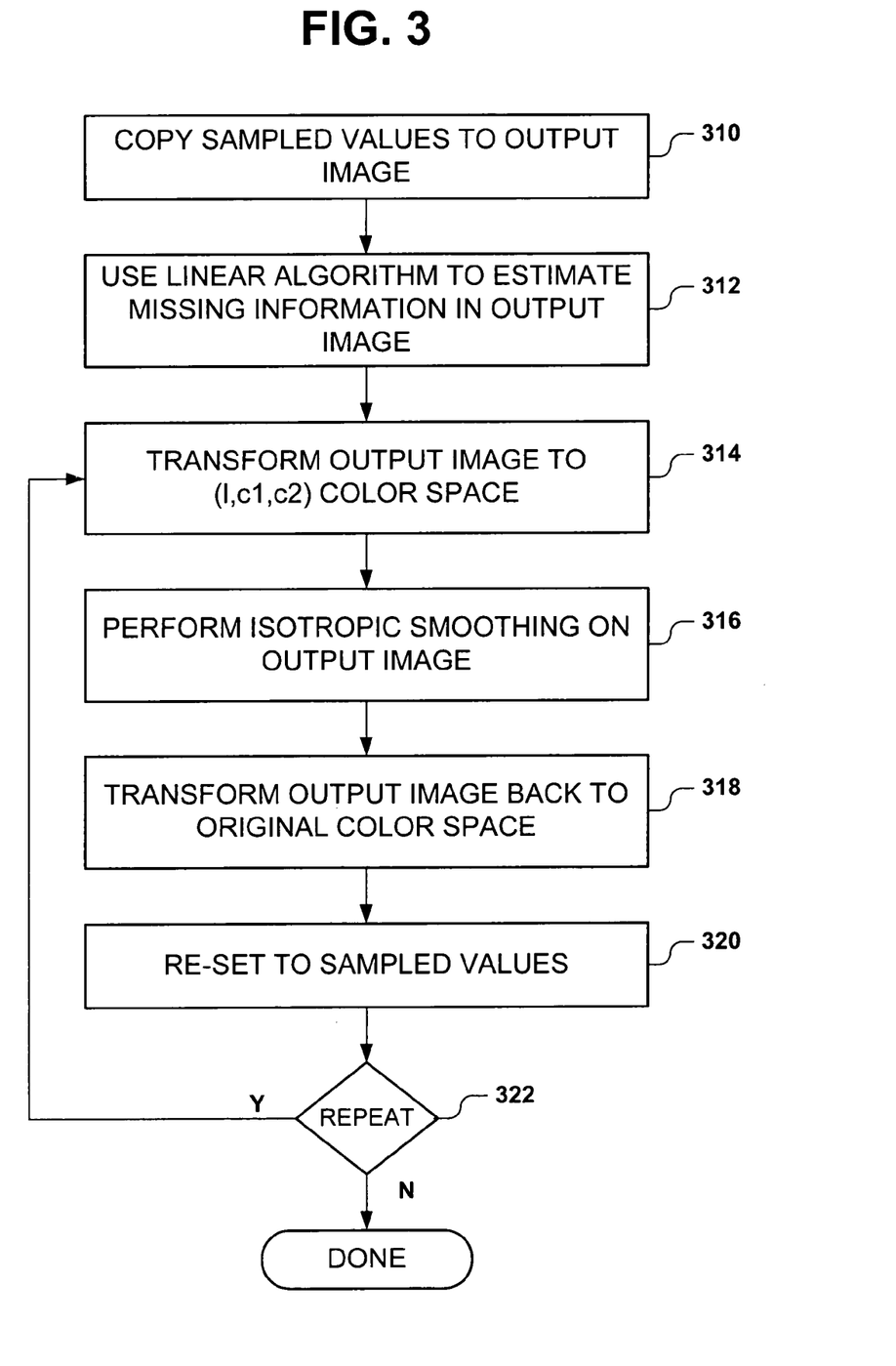
FIG. 3 is an illustration of a method of performing image demosaicing in accordance with a first embodiment of the present invention.

Reference is made to FIG. 3, which illustrates a first embodiment of a method of producing a full color digital image from a mosaic digital image. Sampled values in the mosaic image are copied directly into their corresponding positions in the output image (310). A linear algorithm such as bilinear or bi-cubic interpolation is used to estimate missing information in each of the green, red and blue color planes (312). The full color output image is transformed to $(I, c_1, c_2)$ color space (314).

Isotropic smoothing is performed on the transformed output image (316). The smoothing includes light isotropic smoothing of the luminance component of the transformed image, and heavy isotropic smoothing of the chrominance components. The isotropic smoothing may involve low pass filtering, or a convolution with a Gaussian with a specific variance. The variance of the Gaussian controls the amount of smoothing. The isotropic smoothing is also a linear operation.

The output image is transformed back to its original color space (318). Corresponding pixel values in the re-transformed image are re-set to the sampled values (320).

Additional iterations may be performed (322). Each additional iteration includes steps 314-320. The number of iterations may be a fixed number.

Since all steps are linear, a fixed number of iterations can be concatenated into a single linear operation. If the pre-processing and post-processing operations are also linear, those operations may also be concatenated into the single linear operation.

From this single linear operation, a set of linear convolution kernels can be generated. The single linear operation can be treated as block shift-invariant filter, which allows the filter kernels to be generated by using the method disclosed in assignee's U.S. Ser. No. 10/638,755 filed Aug. 9, 2003. For a Bayer CFA, there would be twelve kernels: four kernels per cell for each color plane.

Figure 4:
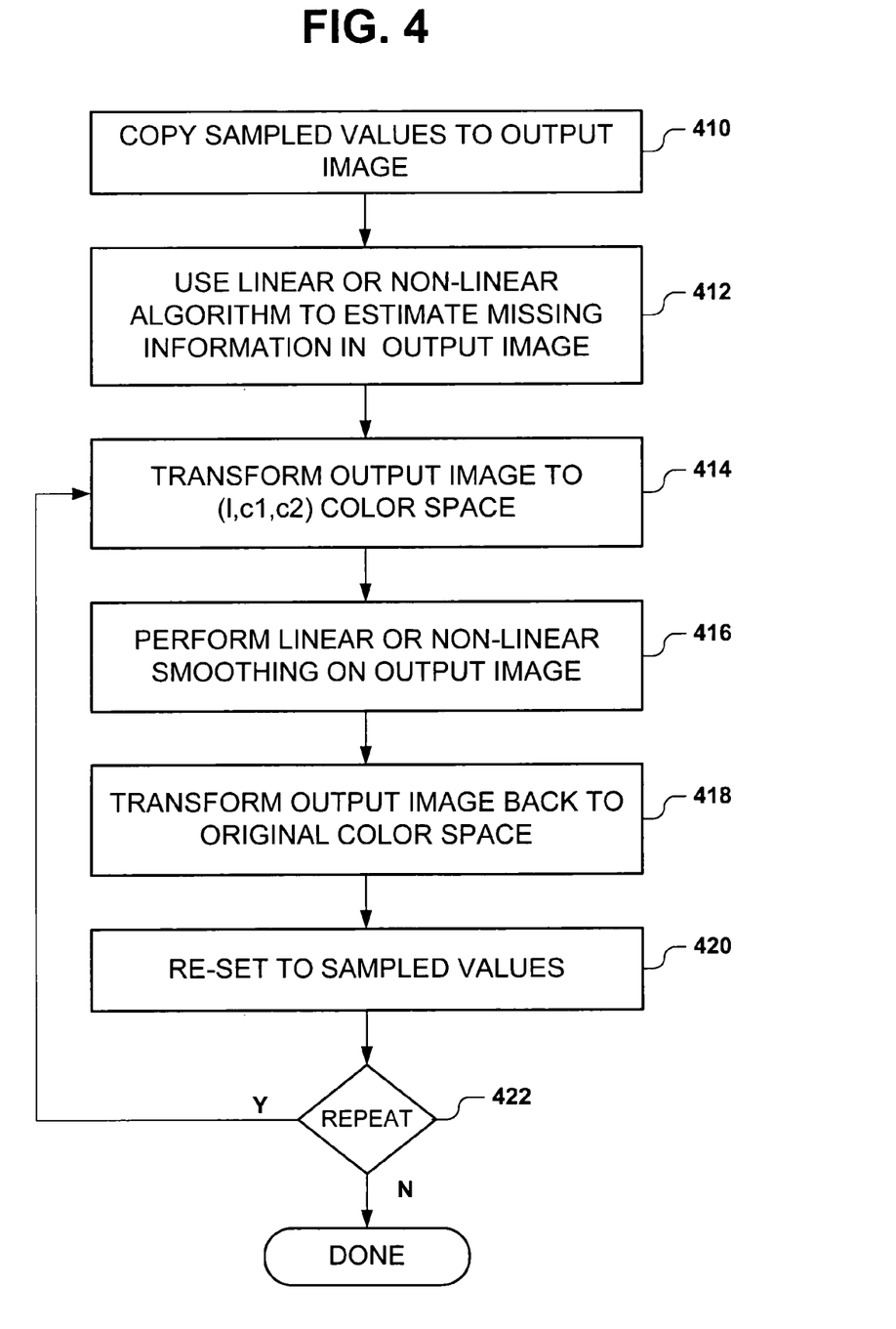
FIG. 4 is an illustration of a method of performing image demosaicing in accordance with a second embodiment of the present invention.

Reference is made to FIG. 4, which illustrates a second embodiment of a method of producing a full color digital image from a mosaic digital image. Sampled values in the mosaic image are copied directly into their corresponding positions in the output image (410). An algorithm is used to estimate missing information in each of the green, red and blue color planes (412). The algorithm may be linear (e.g., bilinear interpolation) or non-linear. Exemplary non-linear interpolation algorithms are disclosed in U.S. Pat. No. 6,404,918 (directional smoothing), U.S. Patent Application 20020186309 published Dec. 12, 2002 (bilateral filtering), and an algorithm disclosed in assignee's U.S. Ser. No. 10/743,623 filed Dec. 22, 2003.

The full color output image is transformed to $(I, c_1, c_2)$ color space (414), and smoothing is performed on the transformed output image (416). The smoothing includes heavy isotropic smoothing of the chrominance components.

Smoothing may also be performed on the luminance component. The smoothing may include directional or anisotropic smoothing in the luminance component. Anisotropic smoothing is context dependent, such that pixel values appearing across an edge are lightly weighted in the estimation. An advantage of such smoothing is that edges are preserved. In the alternative, no smoothing or sharpening of the luminance component may be performed.

The output image is transformed back to its original color space (418), and corresponding pixel values in the re-transformed image are re-set to the sampled values in the mosaic image (420).

Additional iterations may be performed (422). Each additional iteration includes steps 414-420. If any of these steps are non-linear, the iterations cannot be concatenated into a single batch operation.

Figure 5:
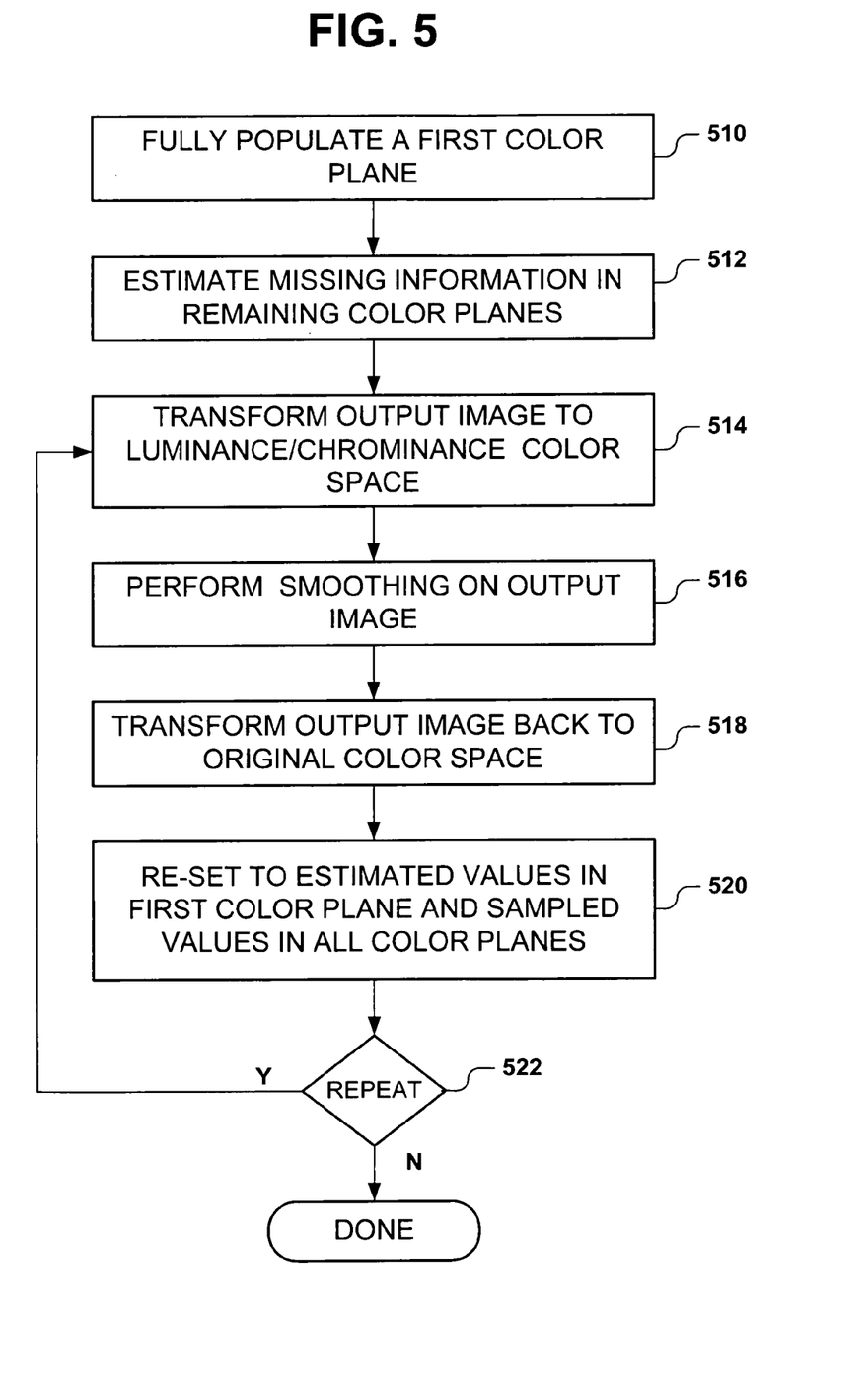
FIG. 5 is an illustration of a method of performing image demosaicing in accordance with a third embodiment of the present invention.

Reference is made to FIG. 5, which illustrates a third embodiment of a method of producing a full color digital image from a mosaic digital image. A first one of the color planes is fully populated (510). That is, missing information in the first plane is estimated. The first color plane may be fully populated by a linear or non-linear algorithm. As a first example, the first color plane may be fully populated by bilinear interpolation. As a second example, the first plane may be fully populated by a directional smoothing method disclosed in U.S. Pat. No. 6,404,918. As a third example, the first color plane may be fully populated by a bilateral filtering method disclosed in U.S. Patent Application 20020186309 published Dec. 12, 2002. As a fourth example, the first color plane may be fully populated by an algorithm disclosed in U.S. Ser. No. 10/743,623.

Other algorithms may be used as well to populate the first color plane. Exemplary anisotropic interpolation techniques are disclosed in M. Black and A. Rangarajan, "On the unification of line processes, outlier rejection, and robust statistics with applications in early vision," International Journal of Computer Vision 19 (1996), no. 1, 57-92; P. Perona and J. Malik, "Scale space and edge detection using anisotropic diffusion," IEEE Trans. Pattern Anal. Mach. Intell. 12 (1990); and C. Tomasi and R. Manduchi, "Bilateral filtering for gray and color images," IEEE International Conference on Computer Vision '98 (New Delhi, India), 1998.

The remaining color planes are estimated (512). The algorithm used to estimate missing information in the remaining color planes may be different than the algorithm used in step 510.

The output image is transformed to luminance/chrominance color space (514), the transformed image is smoothed (516), and the smoothed image is transformed back to the original color space (518).

Pixel values of the first color plane of the output image are re-set to their corresponding sampled values (520) or to their values estimated at step 510. Pixel values in the remaining color planes of the re-transformed image are re-set to their corresponding sampled values (520).

Additional iterations may be performed (522). Each additional iteration may include steps 514-520.

In a mosaic image that corresponds to a Bayer CFA, the green color plane is more densely sampled than the red and blue color planes. In the method of FIG. 5 it is preferable to first interpolate the more densely sampled (green) color plane at step 510, and estimate the remaining (red and blue) color planes at step 512. At step 520 the green plane of the output image is reset to the sampled values and those green values estimated at step 510, and the red and blue planes of the output image are re-set to sampled red and blue values. If linear smoothing is performed at step 516, the entire estimation of the red and blue color planes can be applied in a single batch operation, even if the green color interpolation is performed with a non-linear algorithm.

Figure 6:
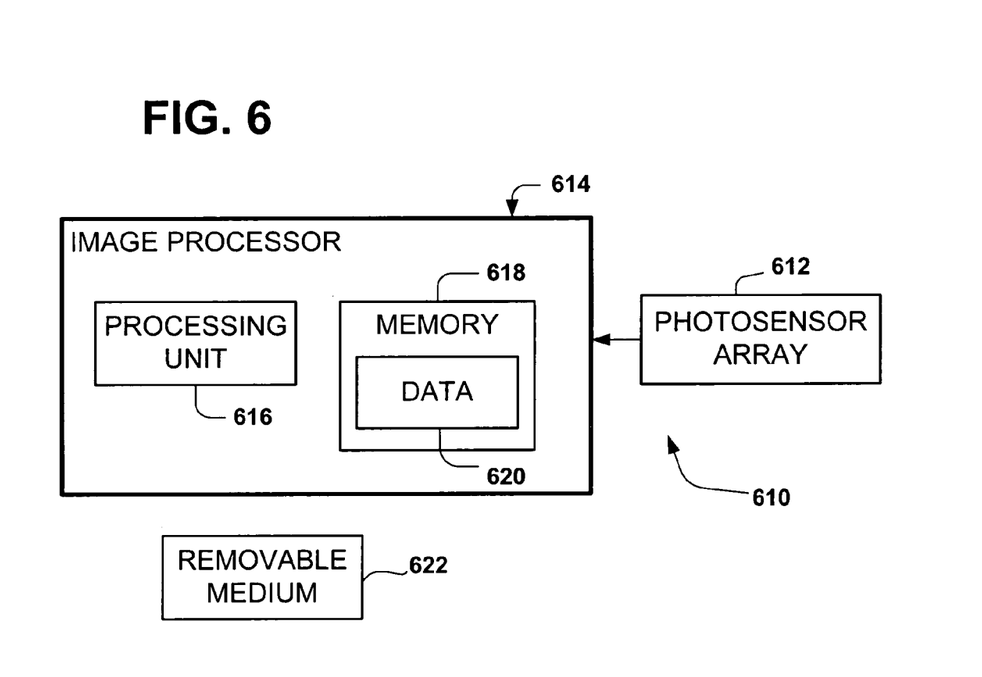
FIG. 6 is an illustration of a digital imaging system in accordance with an embodiment of the present invention.

Reference is made to FIG. 6, which illustrates a digital imaging system 610. The system 610 includes a photosensor array 612 such as a CCD. The photosensor array 612 produces mosaic digital images. Photosensors of the array 612 may be arranged in a Bayer CFA.

The digital imaging system 610 also includes an image processor 614. The image processor 614 includes a processing unit 616 and memory 618 (e.g., EPROM). Data 620 encoded in the memory 618 can be used by the processing unit 616 to transform mosaic images into digital images having full color information at each pixel in accordance with the present invention.

The photosensor array 612 and the image processor 614 may be packaged separately. For example, the photosensor array 612 may be part of a capture device (e.g., a scanner, a digital camera), and the image processor 614 may be implemented in a personal computer or workstation. The processing unit 616 may be a general purpose processor, and the data 620 may include a demosaicing program, which instructs the general purpose processor to transform mosaic images into digital images having full color information in accordance with the present invention. Mosaic images may be supplied to the image processor 614 directly by the capture device or indirectly (via the Internet, accessed from remote or local storage, etc.).

The photosensor array 612 and the image processor 614 may be contained in a single package. For example, the image processing system 610 may be a digital camera.

As a first example, the processing unit 616 of the digital camera may be a digital signal processor, and the data 620 may be an image processing program. The image processing program instructs the digital signal processor to transform mosaic images into digital images having full color information in accordance with the present invention.

As a second example, the processing unit 616 of the digital camera may include an application-specific integrated circuit (ASIC), and the data 620 may include filter kernels. The ASIC convolves the filter kernels with mosaic images to produce digital images having full color information at each pixel. The filter kernels are used to perform linear demosaicing in accordance with the present invention.

Full color images generated by the system 610 can be distributed in any number of ways. For example, the full color images can be distributed via a removable medium 622 such as an optical disc (e.g., DVD) or transmitted (e.g., over the Internet) from memory of one machine to another.

Figure 7:
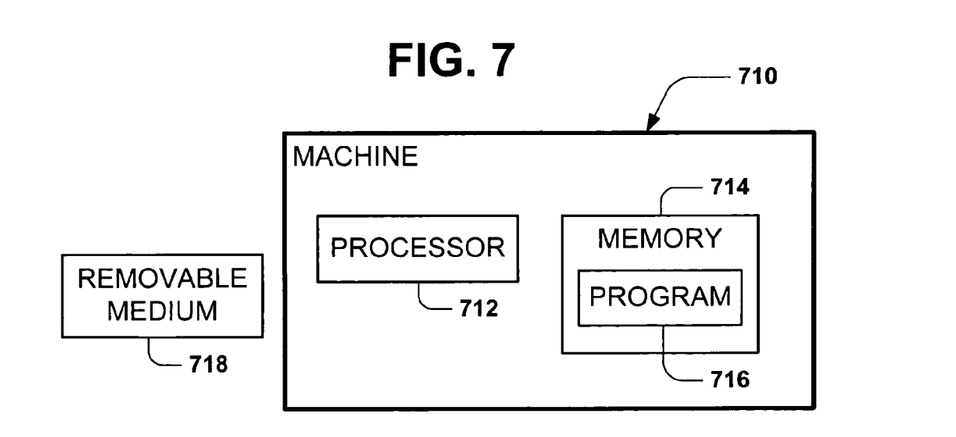
FIG. 7 is an illustration of an apparatus for generating an image demosaicing article in accordance with an embodiment of the present invention.

Reference is now made to FIG. 7, which illustrates a machine 710 for generating a demosaicing program or filter kernels. The machine 710 includes a general purpose processor 712 and memory 714 for instructing the processor 712 to generate the demosaicing program or the filter kernels. The machine 710 may be, for example, a personal computer or workstation.

The machine 710 may generate the demosaicing program by compiling source code into executable code. The executable code may be distributed in variety of ways. For example, the executable code may be distributed to a digital camera by burning the code into memory of the digital camera. The executable code can be distributed (e.g., as an installable package) to a computer via a network transmission, removable storage medium (e.g., optical disc) 718, etc.

The machine 710 may execute a program that generates the filter kernels. The filter kernels may be distributed, for example, via the removable medium 718, by burning the kernels into memory of a digital camera, etc.

The present invention is not limited to the specific embodiments described above. Instead, the present invention is construed according to the following claims.

The invention claimed is:

1. A method of producing a full color digital image from a mosaic digital image having sampled values, the method comprising:
    estimating a full color output image from the mosaic image;
    transforming the output image from an original color space into a luminance/chrominance color space;
    performing smoothing on luminance components of the transformed image;
    performing smoothing on chrominance components of the transformed image
    re-transforming the image with the smoothed chrominance components back to the original color space; and
    re-setting corresponding pixels in the re-transformed image to the sampled values,
    wherein estimating the full color output image includes using a first algorithm to estimate missing information in a first color plane, and using a second algorithm to estimate missing information in remaining color planes of the output image; and wherein the method further comprises setting corresponding pixels in the re-transformed image to the estimated values in the first color plane.

2. The method of claim 1, wherein estimating the full color output image includes using a single algorithm to estimate missing information in all color planes of the output image.

3. The method of claim 1, wherein the first color plane is more densely sampled than the remaining color planes.

4. The method of claim 3, wherein a green color plane is most densely sampled; and wherein missing information in the red and blue color planes is estimated by the steps of transforming, smoothing, re-transforming, and re-setting.

5. The method of claim 1, wherein the luminance/chrominance color space is $(I, C_1, C_2)$ color space where $$\begin{pmatrix} I \\ c_1 \\ c_2 \end{pmatrix} = T \begin{pmatrix} R \\ G \\ B \end{pmatrix} \text{ and where}$$

$$T = \begin{pmatrix} 1/\sqrt{3} & 0 & 0 \\ 0 & 1/\sqrt{2} & 0 \\ 0 & 0 & 1/\sqrt{6} \end{pmatrix} \begin{pmatrix} 1 & 1 & 1 \\ 1 & -1 & 0 \\ 1 & 1 & -2 \end{pmatrix}.$$

6. The method of claim 1, wherein the luminance/chrominance color space is YIQ color space.

7. The method of claim 1, wherein the smoothing of the luminance component is light and the smoothing of the chrominance components is heavy.

8. The method of claim 1, wherein a linear algorithm is used to estimate the output image; wherein the smoothing of the chrominance components is linear; and wherein the method is performed as a single linear operation.

9. The method of claim 8, wherein the single linear operation is performed by a set of kernel filters that are treated as block shift-invariant.

10. The method of claim 1, further comprising at least one additional iteration, each iteration including transforming the output image, smoothing components of the transformed output image, re-transforming the image, and re-setting corresponding pixel values.

11. The method of claim 1, further comprising performing post-processing, the post-processing including sharpening the full color image.

12. The method of claim 1, wherein the mosaic image corresponds to a Bayer CFA.

13. An article comprising memory encoded with software for producing the image produced by the method of claim 1.

14. Apparatus for performing the method of claim 1.

15. An article for a processor, the article comprising memory encoded with software for causing the processor to perform the method of claim 1.

16. An article comprising memory encoded with filter kernels for image processing according to the method of claim 8, wherein the filter kernels apply the single linear operation.

17. The article of claim 16, wherein the filter kernels are generated by treating the method as block-shift invariant.

18. Apparatus comprising a processor for processing a mosaic digital image, the processing including
    estimating a full color output image from the mosaic image; transforming the output image from an original color space into a luminance/chrominance color space;
    performing smoothing on luminance components of the transformed image
    smoothing chrominance components of the transformed image;

re-transforming the image back to the original color space; and re-setting corresponding pixels in the re-transformed image to sampled values of the mosaic image, wherein estimating the full color output image includes using a first algorithm to estimate missing information in a first color plane, and using a second algorithm to estimate missing information in remaining color planes of the output image; and wherein the method further comprises setting corresponding pixels in the re-transformed image to the estimated values in the first color plane.

19. The apparatus of claim 18, wherein estimating the full color output image includes using the same algorithm to estimate missing information in all color planes of the output image.

20. The apparatus of claim 18, wherein the first color plane is more densely sampled than the remaining color planes.

21. The apparatus of claim 18, wherein a green color plane is most densely sampled; and wherein missing information in the red and blue color planes is estimated by the steps of transforming, smoothing, re-transforming, and re-setting the original samples.

22. The apparatus of claim 18, wherein the luminance/chrominance color space is (I, C1, C2) color space.

23. The apparatus of claim 18, wherein the smoothing of the luminance component is light and the smoothing of the chrominance components is heavy.

24. The apparatus of claim 18, wherein a linear algorithm is used to estimate the full color output image; wherein the smoothing of the chrominance components is linear; and wherein the method is performed as a single linear operation.

25. The apparatus of claim 18, wherein filter kernels are used to perform the single linear operation.

26. The apparatus of claim 25, wherein the filter kernels are treated as block shift-invariant.

27. The apparatus of claim 18, wherein the processing further includes performing at least one additional iteration, where each iteration includes transforming the output image, smoothing the components of the transformed output image, re-transforming the image, and re-setting corresponding pixels.

28. The apparatus of claim 18, wherein the processing further includes sharpening the full color image during post-processing.

29. The apparatus of claim 18, further comprising a capture device for generating the mosaic image.

30. A digital camera comprising:
a photosensor array;
a processor; and
memory encoded with data, the data used by the processor to process an output of the photosensor array, the processing including estimating a full color output image from the array output; performing smoothing on luminance components of the transformed image; smoothing chrominance components of the transformed image; and re-setting corresponding pixels in the output image to the original sampled values, wherein estimating the full color output image includes using a first algorithm to estimate missing information in a first color plane, and using a second algorithm to estimate missing information in remaining color planes of the output image; and wherein the method further comprises setting corresponding pixels in the re-transformed image to the estimated values in the first color plane.

31. The digital camera of claim 30, wherein estimating the full color output image includes using the same algorithm to estimate missing information in all color planes of the output image.

32. The digital camera of claim 30, wherein the processing is linear, and wherein the data causes the processor to perform the demosaicing in a single linear operation.

33. The digital camera of claim 32, wherein the data includes filter kernels.

34. The digital camera of claim 30, wherein the data includes a program for instructing the processor to perform the processing.

35. Apparatus comprising:
means for accessing sampled values of an undersampled digital image; and
means for processing the undersampled image to produce a full color image, the processing including
estimating a full color output image from the undersampled image;
transforming the output image from an original color space into a luminance/chrominance color space;
performing isotropic smoothing on luminance components of the transformed image and isotropic smoothing on chrominance components of the transformed image;
re-transforming the smoothed image back to the original color space; and
re-setting corresponding pixels in the re-transformed image to the sampled values,
wherein a fixed number of iterations of the processing is performed as a single linear operation.

36. An article including software stored on a memory for a processor, the article used by the processor to process undersampled images, the processing including
estimating a full color output image of an undersampled image being processed;
performing isotropic smoothing on luminance components of the transformed image;
performing isotropic smoothing on chrominance components of the transformed image; and
re-setting corresponding pixels in the output image to sampled values in the undersampled image being processed,
wherein a fixed number of iterations of the processing is performed as a single linear operation.

37. The article of claim 36, wherein the data includes filter kernels.

38. The article of claim 36, wherein the data includes a demosaicing program.

39. Apparatus comprising a processor for generating data, the data used to process a mosaic image, the processing including the steps of estimating a full color output image from the mosaic image, the output image including estimates of green pixel values; transforming the output image from an original color space into a luminance/chrominance color space; smoothing chrominance components of the transformed image; re-transforming the smoothed image back to the original color space; re-setting corresponding pixels in the re-transformed image to original sampled values; and re-setting corresponding pixels in the re-transformed image to the estimates of the green values.

40. The apparatus of claim 39, wherein the data comprises a set of filter kernels.

* * * * *

UNITED STATES PATENT AND TRADEMARK OFFICE
CERTIFICATE OF CORRECTION

Page 1 of 1

PATENT NO.      : 7,916,940 B2
APPLICATION NO. : 10/769411
DATED           : March 29, 2011
INVENTOR(S)     : Yacov Hel-Or It is certified that error appears in the above-identified patent and that said Letters Patent is hereby corrected as shown below:

In column 1, line 41, delete "This color at each pixel." and insert -- This capability allows a typical digital camera to display and upload images having full color at each pixel. --, therefor.

In column 9, line 24, in Claim 22, delete "(I, C1, C2)" and insert -- $(I, c_1, c_2)$ --, therefor.

Signed and Sealed this

Second Day of August, 2011

David J. Kappos
*Director of the United States Patent and Trademark Office*